United States Patent [19]

Kies

[11] Patent Number: 4,828,280
[45] Date of Patent: May 9, 1989

[54] ICE BIKE

[76] Inventor: James L. Kies, 126 W. Parkwood St., Sidney, Ohio 45365

[21] Appl. No.: 232,953

[22] Filed: Aug. 17, 1988

[51] Int. Cl.⁴ ............................................ B62M 79/00
[52] U.S. Cl. .................................. 280/12.14; 280/714
[58] Field of Search ................... 280/7.14, 12.14, 7.12, 280/7.17, 9, 11, 12 A, 12 B, 12.1, 12.11, 12.12, 12.13, 219, 16, 21 R; 180/186, 196, 227

[56] References Cited

U.S. PATENT DOCUMENTS

| | | | |
|---|---|---|---|
| 469,227 | 2/1892 | Bouse | 280/12.14 |
| 504,625 | 9/1893 | Schmid | 280/12.14 |
| 586,412 | 7/1897 | Anderson | 280/12.14 |
| 1,268,229 | 6/1918 | Frank | 280/12.14 |
| 1,303,637 | 5/1919 | Cowan | 280/12.14 |
| 2,978,251 | 4/1961 | Gerdes | 280/7.14 |

Primary Examiner—Charles A. Marmor
Assistant Examiner—Richard Camby
Attorney, Agent, or Firm—Joseph Patrick Burke

[57] ABSTRACT

The present disclosure is directed to a one-wheel manually powered, two-blade ice bike vehicle capable of both pedal powered and gliding movement over ice wherein selection of the mode of movement is conveniently and safely located at the rider's fingertips in the vicinity of the handlebars with a studded drive wheel tire being raised and lowered readily at the driver's fingertip selection and control by a forked axle mount raising and lowering assembly with spring/cable/handle control assembly. The ice bike moves over the ice via front and rear smoothly contoured, concave bottom blade surfaces with the single studded tire drive wheel being lowered for forward movement. The forward movement is by a centrally located pedal driven sprocket-chain arrangement. The coaster/brake arrangement enables the driver to selectively disengage the studded wheel from the ice and coast the ice bike while the bike is travelling at fairly high speeds, e.g., 25+ miles per hour, by fingertip control in a fraction of a second upon lifting the studded tire drive wheel from the ice surface.

6 Claims, 1 Drawing Sheet

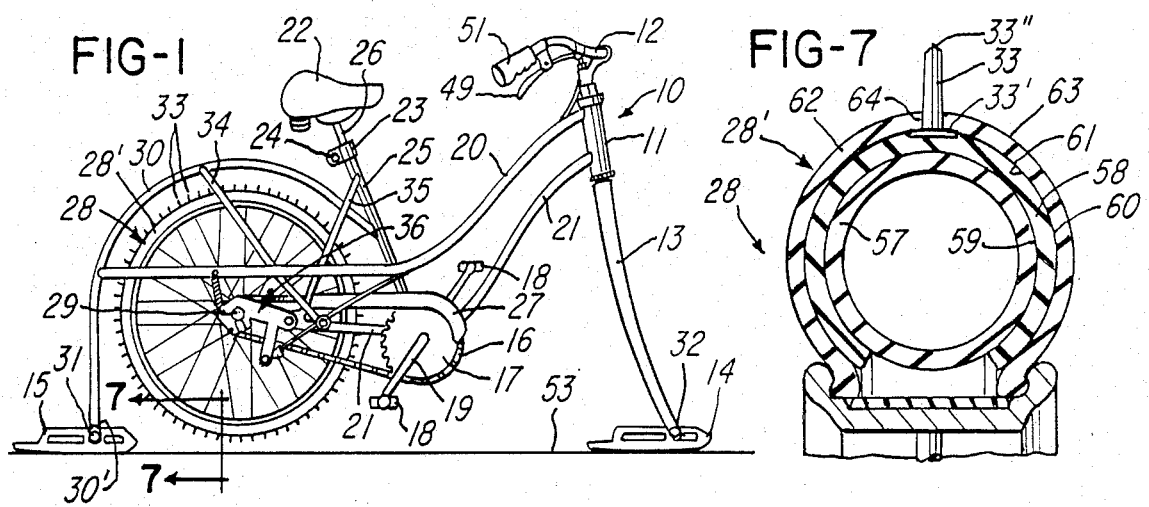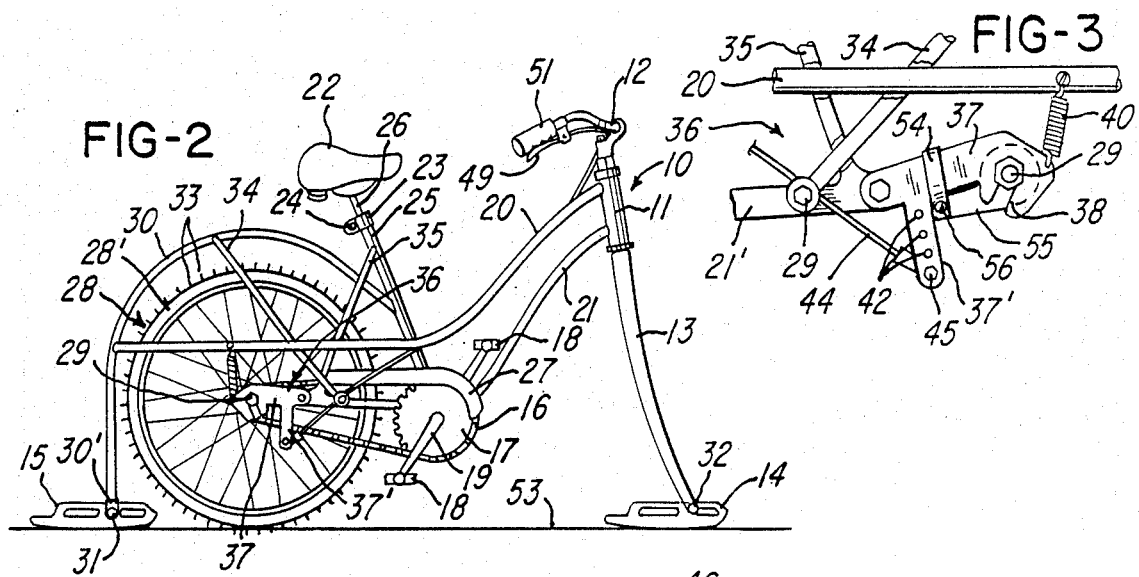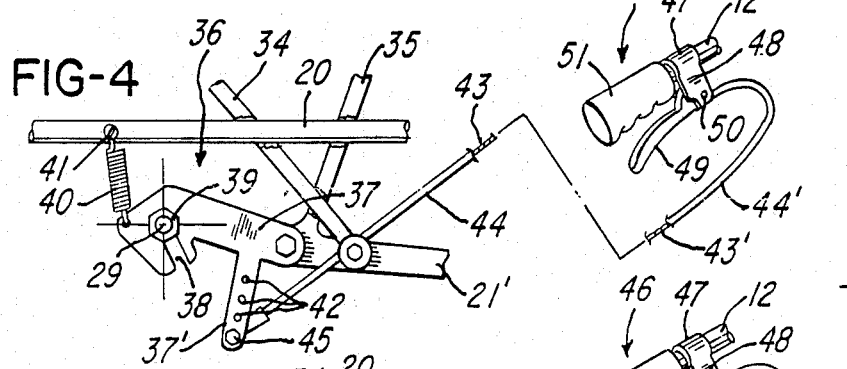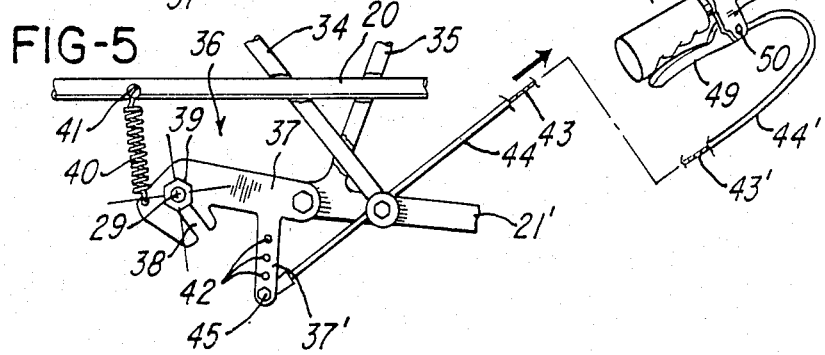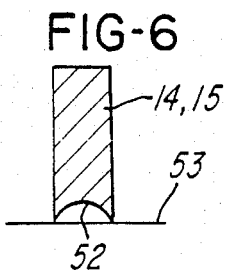

ICE BIKE

BRIEF DESCRIPTION OF THE INVENTION

The present invention is directed to a one-wheel, manually powered, two-blade ice bike vehicle capable of both pedal powered and gliding movement over ice wherein selection of the mode of movement is conveniently and safely located at the rider's fingertips in the vicinity of the handlebars with a studded drive wheel tire being raised and lowered readily at the driver's fingertip selection and control by a forked axle mount raising and lowering assembly with spring/cable/handle control assembly.

The ice bike moves the ice via front and rear smoothly contoured, concave bottom blade surfaces with the single studded tire wheel being lowered for forward movement. The forward movement is by a centrally located, pedal driven sprocket-chain arrangement. The coaster/brake arrangement enables the driver to selectively disengage the studded wheel from the ice and coast the ice bike in a fraction of a second by fingertip control while the bike is travelling at fairly high speeds, e.g., 25 miles per hour, upon lifting the studded tire drive wheel from the ice surface.

BACKGROUND OF THE INVENTION AND PRIOR ART

The overall desire to combine exercise with enjoyment of the outdoors has greatly increased such exercise activities as jogging, golfing, skiing and other outdoor athletic pursuits. Winter activities on ice have been primarily limited to ice skating, ice fishing and ice boat sailing. Ice skating and ice boat sailing both involve a considerable amount of energy, whereas ice fishing involves very little opportunity for exercise. Bicycling on the other hand is considered primarily to be a warm weather sport particularly in the northern climates when snow and ice make conventional bicycling virtually impossible.

Although ice sled and cycle devices which operate on the ice have been disclosed, none of the prior art devices have exhibited a combination of efficient operation and safe controls conveniently available to the drivers/operators of such ice vehicles. Thus such prior vehicles were not dependable, particularly for use by the senior citizens where safety and efficiency of operation are a combination of features that are requisite for use and enjoyment of an ice vehicle. Such vehicles must not only be safe, efficient in their operation and capable of use on ponds and lakes which are frozen over during the winter season; but also such vehicles must be capable of operation at respectable speeds, viz., 25 miles per hour and higher, immediately coasting at these speeds and making very sharp turns and traversing curves while held at an angle of approximately 45 degrees with the ice without sliding on same, as a slide would be dangerous to the driver. Consequently, an ice vehicle possessing features not only capable of high speed operation and suitable for racing, long gliding runs, negotiating of sharp turns, and a quick and responsive braking system resistant to slides causing spills and injury, thereby granting the operator/driver the ability to raise and lower the drive wheel without his/her hands leaving the handle bars constitutes a highly desired combination of features not disclosed or available within the teachings of the prior art.

U.S. Pat. No. 504,625 issued to J. Schmid is directed to an ice velocipede having a sled steering and propelling means. In the ice velocipede of Schmid, if the machine is to be propelled on ice, the shoes or skates 46 and 50 (FIG. 2) are applied to the front and rear sled runners 18 and 15, respectively. A lever-operated arrangement enables the driver to raise or lower the wheel to the extent so as to tilt the frame of the driving wheel 25 and the height of the wheel in relation to the rest of the machine may thus be regulated, viz., the extent of bight of the teeth 26 on the ice can be regulated. By means of the lever 39, the swinging frame may be adjusted so as to bring the driving wheel in the right position to cause its teeth to strike effectively upon the snow or ice. There is no teaching in Schmid of providing for coasting, no less an arrangement which is conveniently located at the fingertips of the operator so as to permit coasting of the Schmid ice velocipede at high speeds in a safe and efficient manner.

U.S. Pat. No. 586,412 issued to C. O. Anderson is directed to an ice velocipede having front and rear runners, 6 and 18, respectively, in combination with a pedal-driven propelling wheel 9 which has inner and outer rims, 11 and 13, respectively, with a plurality of springs 14 between said rims. The outer rim is provided with a plurality of sharp teeth or projections 15 that serve to engage the ice or snow, so that when the wheel is rotated the velocipede is driven. On the end of the frame 19 is a rotatable gear-wheel 25 to engage a rack bar provided with a winding-drum 26, to which is connected a cable 27, that extends forwardly and allows the operator to turn the handle 30, thus providing for an adjustment controlling the extent to which the teeth 15 of the propelling wheel 9 bite, viz., penetrate, the ice to propel the machine. There is no teaching in Anderson of permitting the operator to totally disengage the drive wheel 9 from the ice or to conveniently coast the Anderson ice velocipede. Moreover, it is observed that in order to control the depth and bite of the teeth 15 on wheel 9, it is necessary for the operator to remove his/her hand from the handlebars into a lower position to crank handle 30.

U.S. Pat. No. 1,303,637 issued to A. E. Cowan is directed to a tri-runner sleigh having a propelling wheel 21 with radially extending spurs or projections 22, adapted to engage in ice or snow and propel the sleigh when the wheel 21 is revolved. Associated with the propelling mechanism is a lifting device which consists of a vertically disposed lifting rod 26, pivotally connected at 27 to an arm 24. The rod 26 extends up between the left side and right side frame members 2 and 1, respectively, and is pivoted at 28 to an operating lever 29 pivotally connected to a collar 4. The operator thus must remove at least one hand from the handlebars 10 to operate the lever 29 in order to elevate the propelling mechanism 21 clear of the ice or snow to permit coasting. The location of the propelling wheel 21 substantially forward of the seat 7, combined with the direct pedal/axle arrangement centrally positioned with respect to the propelling wheel 21, restricts the pedaling efficiency of the Cowan tri-runner sleigh by providing poor mechanical advantage to the operator. Moreover, positioning of the spurs or projections between the legs of the operator constitutes a possible source of injury to the driver of the Cowan sleigh in the event of slippage and falling upon the ice.

U.S. Pat. No. 469,227 issued to W. G. Bouse is directed to a 3-runner sled having rounded runners and having front and rear gripping wheels I and F, respectively. The rear wheel F is the propelling wheel located vertically between the sides of the fork A'. The gripping wheel has points H to allow it to be propelled over ice or snow. Springs G' connect the wheel axle supports to a propelling wheel F to the extremities of the fork A which constantly tend to pull down the wheel F maintaining contact with the ice and assisting to prevent slipping. The front wheels I are provided to afford a grip for the front runner so as to permit it to turn in smooth places and assist in avoiding sliding. Hand-lever L, pivoted at 1, elevates or depresses the rod K, which in conjunction with springs m, may be employed to force down the wheels I when the rod K is released. It will be observed that there is no provision in the Bouse sled to permit coasting by elevation of the rear wheel F. Moreover, no coaster/brake mechanism is disclosed. The Bouse sled suffers from the same problems previously mentioned with high speed turns for the same reasons as Cowan.

U.S. Pat. No. 526,745 issued to G. Riexinger is directed to an ice velocipede having a front skate or runner b, the lower longitudinal edge d of which is beveled to a sharp edge (FIG. 4) and double rear runners or skates K K' likewise beveled at d. A hollow propelling wheel, consisting of hub L and a U-shaped rim M with the sprocket wheel 1, connected with a sprocket wheel G by a chain-belt g. Located within U-shaped rim M there are a series of spring loaded dogs N pivoted at n and terminating in points o (FIG. 2). These dogs protrude through a series of holes p having at the outer ends of studs R lock-nuts Q Q'. Spiral springs P are interposed between the rim and the dogs around the studs enabling the pushing of the dogs tangentially from the rim M. There is no provision in the Riexinger ice velocipede for lifting the propelling wheel from the ice and permitting the driver to coast the vehicle. Riexinger does disclose a rather complicated scraper brake arrangement employing a handle U to operate on a brake lever S pivoted to the lower end of one of the branches J (FIG. 1) and connected to U via four connecting rods V'''', V''', V' and V and bell cranks W' and W to cause the downwardly bent long arm S to act as a scraper on the ice with its point T. This brake lever U is pivoted to one arm of the steering handle C at u.

U.S. Pat. No. 1,268,229 issued to F. X. Frank is directed to a bicycle sled having a rear-mounted drive wheel J equipped with radially projecting gripping studs 2. The Frank sled is equipped with front runner 28 equipped with lever bar 29 and has a double back runner 17 composed of spaced members 18 with the drive wheel J being positioned between members 18. A coil tension spring 26 acts to maintain the rear runner 17 in a substantially horizontal position and also acts to absorb shocks and jars due to unevenness in the ice surface.

All of these prior art patents lack a teaching of adjustments that can be made while operating at full speed.

BRIEF DESCRIPTION OF THE DRAWINGS

FIG. 1 is a side view of the ice bike of this invention with its studded drive wheel 28 elevated while in the coasting (glide) position.

FIG. 2 is a side view of the ice bike of this invention with its studded drive wheel lowered in the pedalling (drive) position.

FIG. 3 is an enlarged partial view of the coaster brake mechanism employed in accordance with this invention.

FIG. 4 is an enlarged fractional view of the coaster brake mechanism in the coasting (glide) position.

FIG. 5 is an enlarged fragmentary view of the coaster brake mechanism in the pedalling (drive) position shown in FIG. 2.

FIG. 6 is a cross sectional view of the concave, smoothly-contoured configuration of the front and rear runner blade.

FIG. 7 is a cross-sectional view of a preferred studded tire for use in accordance with this invention.

DETAILED DESCRIPTION OF THE INVENTION

As will be apparent from FIG. 1, ice bike 10 is equipped with handlebars 12, the central downward portion of which are attached to a steering shaft portion (not shown) located within steering shaft housing 11 of a bifurcated fork assembly 13 whose lower portion (ends) are connected to front runner blade 14 by any suitable attachment means 32, for example a bolt and nut arrangement.

Corresponding rear runner blade 15 is attached by its suitable attachment means 31 to the lower portion 30' of the rear blade frame 30. As will be noted from FIGS. 1 and 2, the central and upper portions of rear blade frame 30 are curved in a generally parallel manner with the outer surface of studded tire 28'. The upper portion of rear blade frame 30 is welded, bolted, or otherwise secured to the seat adjustment housing frame support 25 (FIG. 1). Upper frame support bar 20 and lower frame support bar 21 with its rear extension portion 21' provide the main horizontal structural members of the ice bike of this invention. Seat 22, with its corresponding seat adjustment collar 23 and seat adjustment lock nut 24, is positioned on the upper portion of the seat post 26.

Drive wheel 28 mounted on axle 29 contains a studded tire 28' having radially projecting studs 33 to aid in gripping the ice and securing contact with same for forward driving of the ice bike of this invention when said studded wheel/tire assembly is lowered to permit contact with the surface of ice 53 as shown in FIG. 2 illustrating the ice bike in drive position.

Studded tire 28', according to a preferred embodiment of this invention, is a multi-layered structure comprised of an inflatable inner tube 57 (FIG. 7) resting on the interior concave curved surface (rim) of wheel 28. The outer convex surface of inner tube 57 bears against the concave inner surface 59 of intermediate protective layer 58, which can be a tubeless tire, whose bead structure has been removed. Outer convex surface 60 of protective layer 58 fits snugly up against the inner concave surface 61 of outer beaded tubeless tire 62. Holes or openings 64 were provided in the outer tubeless tire 62 spaced substantially uniformly around its periphery in a staggered or linear manner to accommodate studs 33 whose rear head (flange) 33' then bears against the outer convex surface of protective layer 58 with the shank or pointed portion 33" of studs 33 facing outwardly through openings 64 from the convex outer surface 63 of ourter tubeless tire 62. Other studded tires can be used however. Preferablly studs 33 are made from standard roofing nails having an approximate one-half inch diameter flat head with a pointed shaft portion reduced in length to approximately one-half inch. It was found that these studs gave the driver a very good gripping on the ice combined with a smooth comfortable ride.

Drive chain 16 is connected to drive sprocket 17 from whose hub (not shown) extends pedal arm 19 with pedals 18 on each arm to constitute the drive or pedal assembly. Preferably chain guard 27 is employed to protect the driver of the present ice bike from contact with the drive chain 16. Frame support bar 34 is employed to reinforce rear blade frame 30 in its attachment to the rear extension 21' of the lower frame support 21. Intermediate frame support bar 35 is connected to the seat adjustment housing and frame support 25 at its upper end and to the rearward portion of the rear extension 21' of the lower frame support bar 21. As will be shown from FIGS. 1, 4 and 5, swivel raising and lowering assembly 36 is employed to permit the driver of the ice bike of this invention to raise and lower the rear drive wheel. Central to this raising and lowering assembly is forked axle mount 37 with a downwardly extending arm 37/and having axle mount jaw 38 fitted over coaster brake/drive wheel common axle 29 and secured to this axle by axle lock nut 39.

The wheel lift spring 40 (FIGS. 3, 4 and 5) is attached to upper frame support bar 20 by any suitable securing means 41, e.g., a bolt and nut.

A plurality of openings 42 are provided on forked axle mount 37 to permit varying the positioning of the mounting for cable anchor means 45, which can be attached in any of the desired openings 42. Wheel lower cable 43 is protected by sleeve 44 and has its upper portion 43' protected by cable sleeve upper portion 44' (FIGS. 4 and 5).

As shown in FIGS. 4 and 5, cable handle lowering assembly 46 is mounted to handlebars 12 by mounting member 47 having an integral mount arm portion 48. Cable lowering control handle 49 is attached to the upper end of lowering cable 43 by any suitable attaching means 50, e.g., a pin having an opening with appropriate cotter retainer means to prevent removal of same.

Coaster brake arm 55 has coaster brake clamp 54 to secure it to the forked axle mount 37 as is shown in FIG. 3. A positioning bolt 56 with accompanying nut means (not shown) is employed to position the coaster brake clamp 54 on the coaster brake arm 55.

As is shown in FIG. 6, the lower portion 52 of front and rear runner blades 14 and 15 has a smoothly contoured concave bottom blade surface to permit two points of gripping on the ice upper surface 53 during driving and coasting of the ice bike of this invention.

In order to lift the drive wheel 28 and studded tire 28' from the ice surface (FIG. 1), the rider releases the hand grips. This raises the spiked wheel off the ice by releasing the spring 40 attached to the horizontal rearward portion 20 of the upper frame support bar. The spiked wheel can then be lowered, as desired (FIG. 2), to contact the upper ice surface by applying pressure to both of the cable handles 49 on the bike handlebars. Thus it will be observed that the driver (operator) controls the extent of pressure (bite) of the spikes on the ice surface at all times with the fingers (except dfuring coasting). Hence should the driver see a bump or irregular projection in the ice surface, he can slack up on his finger pressure on lever(s) 49 to handle this projection without a change in steering. These handles can be of the same type conventionally employed to operate conventional bicycle brakes.

It should be understood that the ice bike of this invention can be provided with a rear fender (not shown) to cover the rear blade frame 30. Similarly, instead of the present gearing system shown, the ice bike of this invention can be provided with 3, 5, 10, 18 speed, etc., gear drive systems to provide the corresponding speeds of operation. A conventional coaster brake system is contemplated for use on the ice bike of this invention. These and other features of this invention permit a conventional bicycle to be readily retro-fitted with the indicated modifications so that the driver can enjoy biking in all types of weather.

Thus it will be observed that the driver of the ice bike of this invention need not remove his hands from the handlebars in order to raise and lower the spiked drive wheel. Moreover, the smoothly concavely shaped blades utilized in the present invention blades allow for sharp turns and fast curves to be taken by the driver while obtaining a good grip on the ice no matter which way the driver desires to turn. The present invention by achieving the ability to raise the drive wheel by releasing the grip on the handles 49 enables the driver to eliminate drag of the wheel on the ice allowing the ice bike to coast (glide) a considerable distance on the ice. The incorporation and use of a conventional coaster brake enables quick and easy stops by the driver merely pressing the handles 49, dropping the wheel and accomplishing braking of the ice bike.

I claim:

1. A one wheel, manually powered, two blade ice bike vehicle, capable of both pedal powered and gliding movement over ice and wherein selction of the mode of movement is conveniently and safely located at the rider's fingertips, comprising
   a fork assembly whose lower portion is connected to a front runner blade and whose upper portion passes through a steering shaft housing and forms a steering shaft to which handlebars are attached,
   an upper frame support bar secured at one end to said steering shaft housing and at its other end to a rear blade frame,
   a lower frame support bar secured at one end to said steering shaft housing and at its other end to a coaster brake/wheel common axle,
   a seat adjustment housing and frame support secured at its upper portion to an intermediate frame support bar and at its lower portion to the rear portion of said lower frame support bar,
   a seat adjustably mounted in said seat adjustment housing and frame support,
   front and rear runner blades mounted at the bottom of said fork assembly and rear blade frame, respectively,
   a pedal-driven wheel drive assembly mounted on said lower frame support bar and containing drive sprocket and chain members,
   a rear tire dirve wheel provided with ice gripping means and mounted on said coaster brake/wheel axle,
   a forked axle mount swivel raising and lowering assembly, for raising and lowering said drive wheel, mounted at its rear end on said coaster brake/wheel axle and connected to the rear portion of said upper frame support bar and secured at its front end to the rear portion of said lower frame support bar,
   cable means attached at its lower end to said forked axle mount assembly and at its upper end to a handle bar-mounted cable control means, and spring means mounted at its upper portion to a rear portion of said upper frame support and at its lower end to a rear portion of said forked axle mount, whereby upon releasing said handle bar mounted cable control means said drive wheel is raised placing said ice bike in the glide mode whereas upon application of pressure to said cable control means said drive wheel is lowered to contact the ice surface placing said ice bike in the drive mode.

2. An ice bike as in claim 1 wherein both front and rear runner blades have a smoothly contoured, concave bottom blade surface.

3. An ice bike as in claim 1 wherein said cable control means comprises at least one handle mounted near at least one of the handlebar ends adjacent to the hand gripping areas thereof.

4. An ice bike as in claim 1 wherein said forked axle mount has an arm provided with a plurality of openings permitting mounting the lower end of said cable means at a plurality of positions.

5. An ice bike as in claim 1 wherein said rear tire drive wheel is comprised of an inflatable inner tube, an intermediate protective layer whose outer surface contacts the head portion of studs whose shafts protrude through openings in an outer tubeless tire, said protruding shafts constituting said ice gripping means.

6. An ice bike as in calim 3 wherein the extent of finger pressure exerted by a drive of said ice bike upon said handle controls the bite of said ice gripping means on the ice surface.

* * * * *